Patented Sept. 16, 1952

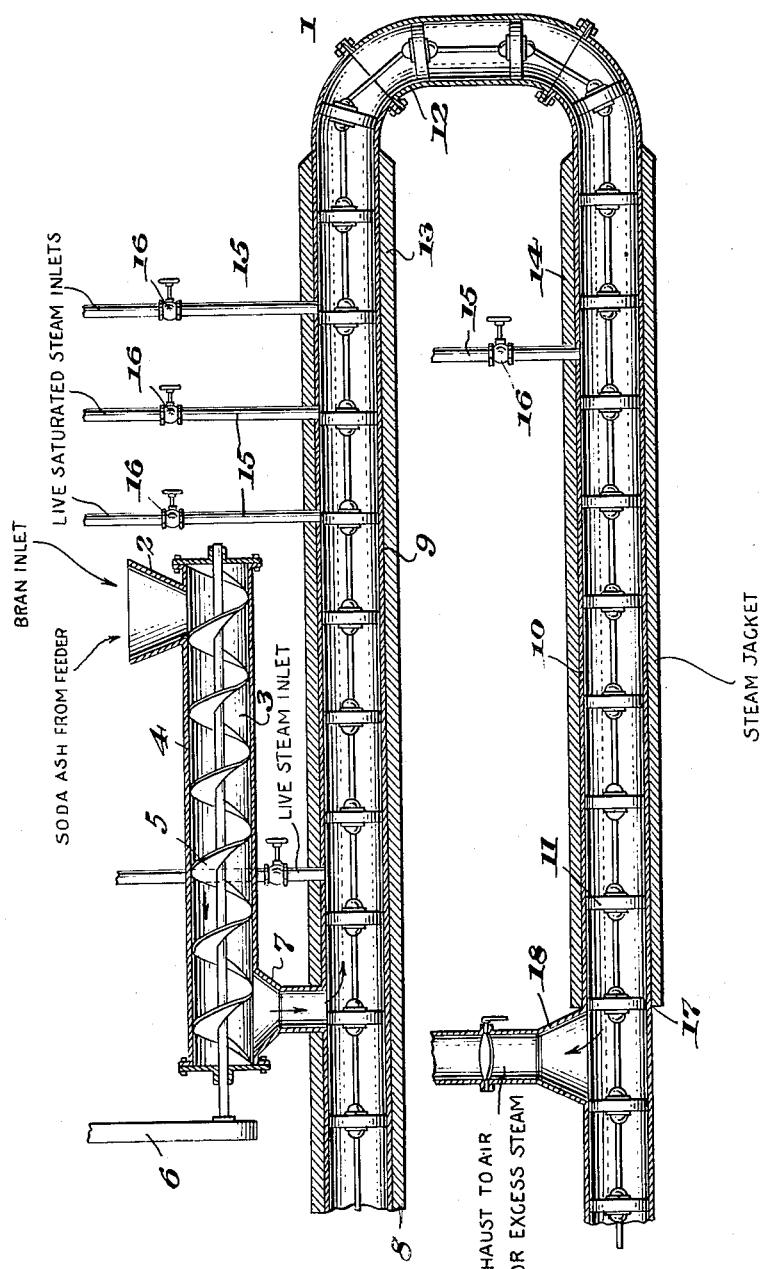

2,610,914

UNITED STATES PATENT OFFICE 2,610,914

METHOD FOR TREATING RICE BRAN AND RICE POLISH

Millard Mike Cassidy, Pasadena, and Harriet Louise Burns Nawry, Houston, Tex., assignors to American Rice Growers Cooperative Association, Lake Charles, La., a corporation of Louisiana Application April 24, 1951, Serial No. 222,654

9 Claims. (Cl. 99—80)

1

This invention relates to a method for treating rice bran and/or rice polish to retard fatty acid development present in the bran and/or polish, and to, therefore, preserve over a considerable period of time, the oils present in the rice bran and/or rice polish, or a mixture thereof.

It is the principal object of this invention to provide an improved method for treating rice bran and/or rice polish, or a mixture thereof, by adding a desired amount of an alkali metal carbonate to the material to be treated, and thereafter steaming the mixture not only to stabilize the mixture more effectively, but also to neutralize the fatty acids present in the oil contained in the bran and/or polish.

In connection with the oils present in bran and rice polish, it is common knowledge that fatty acids develop by oxidation and enzymatic action at an accelerated rate as compared to other oil bearing materials. This is especially true when the oil in the bran remains untreated for a considerable length of time, thereby resulting in an oil of inferior quality. One method heretofore used to preserve the oil in milled rice bran and rice polish is described in my pending application, Serial No. 97,715, filed June 7, 1949, now Patent No. 2,563,798 granted August 7, 1951, for "Method of Treating Rice Bran and Rice Polish," the present application being a continuation-in-part thereof.

The present invention is an improvement over the method described in the above pending application and comprises treating the bran and polish after an alkali metal carbonate is added thereto, the addition of the alkali metal carbonate, together with the treating process, contributing greatly to preventing fatty acid development.

A further object of the invention, therefore, is to treat freshly milled rice bran and/or rice polish with a small amount of an alkali metal carbonate, and to heat the mixture with live steam at a temperature, and for a period of time most effective to eliminate the development of fatty acid in the oils of the bran.

A still further object of this invention is to stabilize the oil present in rice bran and/or rice polish to permit storage of the bran or polish for a longer period of time than has heretofore been possible without undue further development of the fatty acid content of the oil in the bran or polish.

Yet another object of this invention is to provide equipment for treating rice bran and/or rice polish to eliminate the development of fatty acid therein comprising a hopper and first conveyor section for mixing an alkali metal carbonate with the material, a second section for treating the mixture with live steam, and a third section for further treating the mixture with live steam prior to storage.

The above and other advantages of this invention will best be understood by referring to the following detailed specification of a preferred embodiment thereof, and to the accompanying drawing, in which the sole figure is a schematic illustration of the equipment and steps in treating the material.

It is to be understood that the equipment shown in the drawing is merely for illustrative purposes, and is not to be construed as a limitation of the invention as modifications of the equipment may clearly be made. However, the equipment shown has proved successful in applying the teachings of this invention.

Referring to the drawing, the entire equipment generally represented by numeral 1 comprises an intake hopper 2 for delivering the material to the screw conveyor 3, the conveyor 3 being fitted within a standard pipe 4, and having agitating and conveying means shown as worm paddles 5 in order to thoroughly mix the material fed therein. Numeral 6 represents a drive means for the conveyor 5, and this means may be regulated whereby the material is fed from the inlet hopper 2 to the outlet hopper 7 at any desired speed.

From the outlet hopper 7 material passes to conveyor 8 comprising sections 9 and 10. The conveyor shown is of the piston type as indicated by the plurality of spaced pistons 11. The entire conveyor 8 is fitted within a standard pipe 12, and each section 9 and 10 is steam jacketed as shown at 13 and 14. Spaced about every four to eight feet in each section of the conveyor are steam inlet pipes for feeding steam directly onto the material in the conveyor. In the drawing, these inlet pipes are represented by numeral 15, and although there are four such inlets shown in the first section and one in the second section, it is to be understood that the inlet pipes may be spaced in both sections as desired, and any number may be used. Each steam inlet pipe is provided with an adjustable valve 16. At the end 17 of the second section of the conveyor there is provided an outlet 18 for use as an exhaust to air for the excess steam, the treated material being fed to a storage bin, not shown.

By the present process the fatty acid development of the oils present in the rice bran or rice polish may be retarded for a desired period of time by bringing the temperature of the bran and/or polish within a certain range, and also by adding an alkali, and particularly an alkali metal carbonate, to the bran and/or polish before heating. It has been found that the addition of an alkali, and particularly an alkali metal carbonate, prior to heating is an important deterrent to the development of the fatty acids in the oils of the bran and polish, and that the addition of this substance, together with heating to a certain temperature, renders an extraordinary result.

Sodium carbonate and potassium carbonates are examples of the alkali metal carbonates preferred. Although it is preferred to apply the alkali metal carbonate in dry powdered form, it may be added to the bran by means of an atomized spray or while in the form of an aqueous solution.

Care must be taken not to scorch or burn the material being treated, and this is accomplished by the use of live steam as the heating medium. After storage of the treated material for a reasonable time there may be extracted therefrom an oil of substantially lower fatty acid content and having a lower refining loss than can be extracted from untreated bran and/or polish that is milled at the same time and stored under the same conditions and for the same period of time. Also, it has been found that the oil extracted after treating by the instant process contains a lower fatty acid content than the oil treated by the process of application, Serial No. 97,715. It is believed that the improved results are due to (1) the addition of a certain amount of an alkali metal carbonate prior to treatment, and (2) heating the mixture with live steam within the temperature range and for the length of time hereinafter described.

As an example of the application of this process, but not as a limitation of the same, the treatment is carried out in the following manner:

Rice bran and/or rice polish, or a mixture of the two is, substantially immediately after removal of the bran and/or polish from the rice grain, fed into hopper 2. It is necessary and highly essential that the material be treated immediately after rupture because fatty acid development of oil in the bran and polish increases at an accelerated rate after removal from the grain. It has been proven that fatty acids in the oil of untreated grain will develop at the rate of about 1% per hour for the first few hours when stored at 25° C. In other words, it is important that freshly milled rice and/or bran be treated.

Also fed into hopper 2 is an amount of an alkali metal carbonate, such as dry sodium carbonate, the amount depending upon the fatty acid content of the bran and polish to be treated. An amount up to 10 parts by weight of the alkali metal carbonate to 100 parts by weight of the bran and/or polish has proved satisfactory.

Specifically satisfactory results have been achieved by the use of about 1% by weight of sodium carbonate added to the freshly milled material, i. e., 1 part by weight of sodium carbonate to 100 parts by weight of the material. It is to be understood that the amount of soda ash may be varied depending upon the fatty acid content of the material, although the preferred ratio of soda ash to the entire mixture is small.

The bran and/or polish and soda ash is then thoroughly mixed by passage through the conveyor 3. As explained above, the speed at which the mixture is fed from hopper 2 to hopper 7 may be regulated to make certain that the bran and polish and soda ash are thoroughly intermingled to provide a homogeneous mixture. Similarly, the speed of movement of conveyor 8 may be regulated, as desired.

The homogeneous mixture is then fed into the first section 9 of the conveyor 8, and live steam is applied directly to the material to agitate, heat and increase the moisture content thereof. The temperature of the live steam applied in the first section is from about 200° to 230° F., and means is provided to control the increased moisture content of the homogeneous mixture to within a range of from 8% to 15.5%.

This temperature with a controlled moisture range, it being conventional to control the moisture, is highly critical in the instant process. The temperature range has proved effective to give best results and the moisture range has proved effective to prevent the material from adhering to the walls of the conveyor and to prevent scorching of the material. At the same time, the moisture range is not detrimental to the extent that the starches will gelatinize and the proteins will coagulate to any harmful extent. Steam is applied to the material in the first section for about five to fifteen minutes to permit thorough penetration of the material by the steam, and to insure heating of the material to a range of 200° to 230° F.

In practice, contact time of about ten minutes has been found sufficient time to allow thorough penetration of the material with the bran and polish. The increase of moisture of the mixture is of greater value in taking the soda ash into solution and making it more reactive, and the use of live steam, in place of other heating means, is essential as steam makes the mixture more porous and the oil contained therein more accessible to the soda ash solution. Also, steam penetration inactivates the lipase which causes rapid free fatty acid development of freshly milled bran. In other words, steam is used as a moisture control as well as a heat control factor.

The heated mixture thereafter passes to the second section of the conveyor 10, the drying zone, where it is treated with live steam at a temperature of from 230° to 260° F., and with a controlled moisture range. It has been found that this temperature will decrease the moisture content of the material to 11% to 12.5% prior to storage in a bin, and that a moisture content of 11% to 12.5% is most satisfactory for preventing the bran from adhering to the sides of the storage bin, to prevent scorching, and to eliminate a lump condition in the bran after treating. This temperature range is critical as better results have been achieved than when other ranges are used.

Obviously, some of the live saturated steam in the first section travels along the conveyor into the second section of the conveyor. However, to prevent too much of this action, is the reason for having a portion of the conveyor between the two sections free of steam inlets. It has been found that the material should be treated in the second section, namely, the drying zone, for a period of from five to fifteen minutes for effective results.

After treatment steam exhausts to the air through outlet 18 and the material is conveyed to storage bins, not shown. The pressure of the steam applied at both sections is generally in the neighborhood of 100 pounds.

From the above description it will be apparent that other devices, machinery or equipment may be used without essential departure from this process.

Experiments made upon bran and polish treated in accordance with the present process and compared with untreated bran and polish of the same kind, character and age which had been stored under the same conditions, and bran and polish of the same character, etc., treated in accordance with the process of application, Serial No. 97,715, and stored under the same conditions, produced the following comparative results:

UNTREATED

| Period of Storage | Percentage of Free Fatty Acid |
| --- | --- |
| 1 week | 18 |
| 2 weeks | 28 |
| 3 weeks | 31 |
| 4 weeks | 35 |

TREATED BY PROCESS OF S. N. 97,715

| | |
| --- | --- |
| 1 week | 4 |
| 2 weeks | 5 |
| 3 weeks | 5 |
| 4 weeks | 6 |

TREATED BY PROCESS OF THIS INVENTION

| | |
| --- | --- |
| After treatment | .63 |
| 63 days | 1.26 |

Numerous other tests have been made which yielded approximately the same comparative results. It is not claimed, however, that the exact comparative results above set out will always be obtained because of the differences which may exist in air temperature, storage, conditions, humidity and milling operations.

The treated oil may be subsequently abstracted from the bran and/or polish by any of the well known methods.

As previously stated up to 10% by weight of alkali metal carbonate may be used. This is the maximum percentage as more than 10 parts by weight of alkali metal carbonate to 100 parts by weight of the bran and/or polish, when used, will cause foaming in distillation columns.

The term "about 1 per cent" or "about 10 per cent" in the claims when referring to the percentage of alkali used by weight to the bran and/or polish used, includes an amount of alkali which may be as much as ½ of one per cent in greater or less amount than the numbered per cent of alkali to the weight of the bran and/or polish.

While we have described one form of the invention it will be understood that other forms within the spirit of the invention may be used, and that we desire to be limited only to the extent set forth in the appended claims.

We claim:

1. The method of treating material consisting of rice bran and/or rice polish to retard fatty acid development of the oils present in the material and to stabilize the oils therein comprising the steps of adding an alkali metal carbonate to said material in the ratio of about 1 to 10 parts by weight of the alkali metal carbonate to 100 parts of the material, depending upon the fatty acid content of the material, directly treating the mixture with saturated live steam at a temperature of approximately 200 to 230° F. to heat and increase the moisture content thereof to increase the moisture content within a range of 8% to 15.5% and thereafter further additionally directly heating the mixture with live steam at a temperature from 230° to 260° F. to decrease the moisture content of the material to 11% to 12.5% to insure thorough penetration of all of the particles of the mixture and for a period of 5 to 15 minutes.

2. The method of treating material consisting of rice bran and/or rice polish to retard fatty acid development of the oils present in the material and to stabilize the oils therein comprising the steps of adding dry sodium carbonate in the ratio of about 1 to 10 parts by weight of the sodium carbonate to 100 parts of the material, depending upon the fatty acid content of the material, directly treating the mixture with saturated live steam at a temperature of approximately 200 to 230° F. to heat and increase the moisture content thereof to increase the moisture content within a range of 8 to 15.5%, immediately further additionally directly heating the mixture with steam at a temperature from 230° to 260° F. to decrease the moisture content of the material to 11% to 12.5% to insure thorough penetration of all of the particles of the mixture and for a period of 5 to 15 minutes, and thereafter partially cooling the mixture.

3. The method of treating material consisting of rice bran and/or rice polish to retard fatty acid develpment of the oils present in the material and to stabilize the oils therein comprising the steps of adding potassium carbonate in the ratio of about 1-10 parts by weight of the potassium carbonate to 100 parts of the material depending upon the fatty acid content of the material, directly treating the mixture with saturated live steam at a temperature of approximately 200 to 230° F. to heat and increase the moisture content to increase the moisture content within a range of 8% to 15.5% thereof, immediately further additionally directly heating the mixture with live steam at a temperature from 230 to 260° F. to decrease the moisture content of the material to 11% to 12.5% to insure thorough penetration of all of the particles of the mixture, the overall minimum heating time to obtain said thorough penetration being and for a period of about 5 to 15 minutes, and thereafter partially cooling the mixture.

4. The method of treating material consisting of rice bran and/or rice polish to retard fatty acid development of the oils present in the material and to stabilize the oils therein comprising the steps of adding soda ash in the ratio of about 1-10 parts by weight of the soda ash to 100 parts of the material depending upon the fatty acid content of the material directly, treating the mixture with saturated live steam at a temperature of approximately 200 to 230° F. to heat and increase the moisture content thereof to increase the moisture content within a range of 15% to 18.5% and thereafter further additionally directly heating the mixture with live steam at a temperature from 230 to 260° F. to decrease the moisture content of the material to 11% to 12.5% to insure thorough penetration of all of the particles of the mixture and for a period of 5 to 15 minutes.

5. The method of treating material consisting of rice bran and/or rice polish to retard fatty acid development of the oils present in the material and to stabilize the oils therein comprising the steps of adding an alkali metal carbonate in the ratio of about 1-10 parts by weight of the alkali metal carbonate to 100 parts of the material depending upon the fatty acid content of the material, directly treating the mixture with saturated live steam at a temperature of approximately 200 to 230° F. for substantially 1.5 minutes to heat and increase the moisture content thereof to increase the moisture content within a range of 8% to 15.5% and immediately thereafter additionally directly heating the mixture with live steam at a temperature from 230 to 260° F. to decrease the moisture content of the material to 11% to 12.5%, and for a period of 5 to 15 minutes.

6. The method of treating material consisting of rice bran and/or rice polish to retard fatty acid development of the oils present in the material and to stabilize the oils therein comprising the steps of adding alkali metal carbonate in the ratio of about 1–10 parts by weight of the alkali metal carbonate to 100 parts of the material depending upon the fatty acid content of the material, agitating and heating the mixture substantially immediately following the removal of the material from the rice grain by directly subjecting the mixture to saturated live steam at substantially 200 to 230° F. and 100 lbs. pressure for a time interval of about 1.5 minutes to increase the moisture content within a range of 8% to 15.5%, further additionally directly heating the mixture with live steam from 230° to 260° F. to decrease the moisture content of the material to 11% to 12.5% and for a period of 5 to 15 minutes to insure thorough penetration of all of the particles of the mixture and thereafter partially cooling the mixture.

7. The method of treating material consisting of at least one of the products rice bran and rice polish to retard fatty acid development of the oils present in the material and to stabilize said oils therein before storage of the material comprising the steps of adding alkali metal carbonate in the ratio of about 1–10 parts by weight of the alkali metal carbonate to 100 parts of the material depending upon the fatty acid content of the material, conveying said mixture to a first section of a conveyor substantially immediately upon its removal from the grain, directly subjecting the mixture in said first section to saturated live steam at substantially 200 to 230° F. to agitate the mixture, to heat the material and to increase the moisture content within a range of 8% to 15.5%, conveying said mixture to a second section of said conveyor, additionally directly heating said mixture in said second section simultaneously with live steam from 230 to 260° F. to decrease the moisture content of the material to 11% to 12.5% for and for a period of 5 to 15 minutes and conveying said mixture to a third section of said conveyor for the purpose of a partially cooling said mixture before storage of the mixture, the overall minimum heating time necessary to obtain thorough penetration being about 4.5 minutes.

8. In a method of treating material consisting of rice bran and/or rice polish to retard fatty acid development of the oils present in the material and to stabilize the oils therein comprising the steps of adding an alkali metal carbonate in the ratio of about 1–10 parts by weight of the alkali metal carbonate to 100 parts of the material depending upon the fatty acid content of the material directly, treating the mixture with saturated live steam at a temperature of 200° F. to 230° F. to heat and increase the moisture content thereof to increase the moisture content within a range of 8% to 15.5% and thereafter further additionally directly heating the material with live steam of 230° F. and for a period of 5 to 15 minutes to 260° F. to insure thorough penetration of all the particles of the mixture by a minimum temperature of 212° F., the overall minimum heating time to obtain said thorough penetration being 10 minutes.

9. In a method of treating material consisting of rice bran and/or rice polish to retard fatty acid development of the oils present in the material and to stabilize the oils therein comprising the steps of adding an alkali metal carbonate in the ratio of about 1–10 parts by weight of the alkali metal carbonate to 100 parts of the material depending upon the fatty acid content of the material directly, treating the mixture with saturated live steam at a temperature of 200° F. to 230° F. to heat and increase the moisture content thereof to increase the moisture content within a range of 8% to 15.5% and thereafter further additionally directly heating the material with live steam of 230° F. and for a period of 5 to 15 minutes to 260° F. to insure thorough penetration of all the particles of the mixture by a minimum temperature of 230° F., the overall minimum heating time to obtain said thorough penetration being 10 minutes.

MILLARD MIKE CASSIDY.
HARRIET LOUISE BURNS NAWRY.

REFERENCES CITED

The following references are of record in the file of this patent:

UNITED STATES PATENTS

| Number | Name | Date |
|---|---|---|
| 1,234,663 | Herendeen | July 24, 1917 |
| 1,381,858 | Bordeau | June 14, 1921 |
| 1,423,830 | Christensen | July 25, 1922 |
| 1,586,869 | Wesener | June 1, 1926 |
| 1,662,401 | Sasseen | Mar. 13, 1928 |
| 1,850,123 | Anderson | Mar. 22, 1932 |
| 2,538,007 | Kester | Jan. 16, 1951 |
| 2,563,798 | Burns et al. | Aug. 7, 1951 |
| 2,571,555 | Fernandes | Oct. 16, 1951 |

FOREIGN PATENTS

| Number | Country | Date |
|---|---|---|
| 263,213 | Great Britain | Jan. 13, 1927 |